(12) United States Patent
Hur et al.

(10) Patent No.: US 10,326,960 B2
(45) Date of Patent: Jun. 18, 2019

(54) DISPLAY APPARATUS AND METHOD FOR CONTROLLING OF DISPLAY APPARATUS

(71) Applicant: SAMSUNG ELECTRONICS CO., LTD., Suwon-si, Gyeonggi-do (KR)

(72) Inventors: Jae-myung Hur, Seongnam-si (KR); Dong-wook Kim, Suwon-si (KR); Seung-il Yoon, Yongin-si (KR); Hyun-kyu Yun, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/648,538

(22) Filed: Jul. 13, 2017

(65) Prior Publication Data

US 2018/0063462 A1 Mar. 1, 2018

(30) Foreign Application Priority Data

Aug. 29, 2016 (KR) ........................ 10-2016-0109856

(51) Int. Cl.
*H04N 5/44* (2011.01)
*G06F 3/16* (2006.01)
(Continued)

(52) U.S. Cl.
CPC ........... *H04N 5/4403* (2013.01); *G06F 3/165* (2013.01); *G08C 17/00* (2013.01); *G08C 23/04* (2013.01);
(Continued)

(58) Field of Classification Search
CPC .......... H04N 5/4403; H04N 5/50; H04N 5/57; H04N 5/63; H04N 21/4104;
(Continued)

(56) References Cited

U.S. PATENT DOCUMENTS 7,924,167 B2   4/2011   Hesdahl et al.
8,482,450 B2   7/2013   Choi et al.
(Continued)

FOREIGN PATENT DOCUMENTS

CN   103701988   4/2014
EP   2 887 288    6/2015
(Continued)

OTHER PUBLICATIONS

Search Report and Written Opinion dated Dec. 28, 2017 in counterpart International Patent Application No. PCT/KR2017/009264.
(Continued)

*Primary Examiner* — Michael Lee
(74) *Attorney, Agent, or Firm* — Nixon & Vanderhye, P.C.

(57) ABSTRACT

A display apparatus and a control method thereof are provided. For example, a display apparatus which may control a hidden external apparatus that cannot be directly controlled by a remote control device and a control method thereof. Some of the disclosed example embodiments may provide a display apparatus which may analyze received first control information for the hidden external apparatus and output second control information for controlling the hidden external apparatus, and a control method thereof.

12 Claims, 11 Drawing Sheets

(51) Int. Cl.
*H04N 5/50* (2006.01)
*H04N 5/63* (2006.01)
*G08C 17/00* (2006.01)
*H04N 21/41* (2011.01)
*H04N 21/422* (2011.01)
*H04N 21/436* (2011.01)
*G08C 23/04* (2006.01)
*H04N 5/57* (2006.01)

(52) U.S. Cl.
CPC ............... *H04N 5/50* (2013.01); *H04N 5/63* (2013.01); *H04N 21/4104* (2013.01); *H04N 21/42204* (2013.01); *H04N 21/43615* (2013.01); *G08C 2201/40* (2013.01); *H04N 5/57* (2013.01)

(58) Field of Classification Search
CPC ........ H04N 21/42204; H04N 21/43615; G06F 3/165; G08C 2001/40
USPC ....... 348/730, 731, 734, 737, 744, 756, 725, 348/723, 719, 716, 714, 706, 838, 636, 348/680, 693, 571, 561, 376, 158, 143, 348/133, 87, 54; 439/44, 74, 119, 192, 439/194, 394, 422, 499, 578, 581; 345/87, 166, 168, 169, 173, 108, 419; 725/9, 25, 37, 56, 116, 118, 133, 141
See application file for complete search history.

(56) References Cited

U.S. PATENT DOCUMENTS

| | | | |
|---|---|---|---|
| 8,717,148 B2 | 5/2014 | Kim et al. | |
| 8,742,972 B2 | 6/2014 | Choi et al. | |
| 9,071,793 B2 | 6/2015 | Choi et al. | |
| 9,262,047 B2 | 2/2016 | Kim et al. | |
| 2005/0122438 A1 | 6/2005 | Sato | |
| 2005/0151886 A1* | 7/2005 | Hirano | G08C 23/04 348/734 |
| 2006/0210278 A1 | 9/2006 | Cregg et al. | |
| 2007/0050832 A1* | 3/2007 | Wright | H04H 60/27 725/115 |
| 2008/0310452 A1* | 12/2008 | Vedantham | H04W 28/06 370/474 |
| 2009/0138805 A1* | 5/2009 | Hildreth | G06K 9/00335 715/745 |
| 2009/0284474 A1* | 11/2009 | Komaki | B60K 35/00 345/173 |
| 2010/0028013 A1 | 2/2010 | Yong | |
| 2010/0315563 A1* | 12/2010 | Park | H04N 21/4108 348/734 |
| 2011/0035773 A1* | 2/2011 | Stecyk | H04L 12/2805 725/38 |
| 2011/0050387 A1 | 3/2011 | Kim et al. | |
| 2011/0050478 A1 | 3/2011 | Choi et al. | |
| 2011/0075046 A1* | 3/2011 | Choi | H01R 23/7073 348/730 |
| 2011/0227911 A1* | 9/2011 | Joo | H04N 13/004 345/419 |
| 2011/0283315 A1* | 11/2011 | Lynch | H04N 21/4113 725/37 |
| 2011/0289543 A1* | 11/2011 | Goosen | H04N 21/4384 725/116 |
| 2012/0019400 A1 | 1/2012 | Patel et al. | |
| 2012/0054803 A1* | 3/2012 | Lee | H04N 21/4755 725/56 |
| 2012/0099024 A1* | 4/2012 | Ryu | G06F 8/67 348/730 |
| 2012/0140124 A1* | 6/2012 | Moroney | H04N 21/42207 348/734 |
| 2013/0278838 A1 | 10/2013 | Choi et al. | |
| 2014/0176808 A1* | 6/2014 | Mickelsen | G08C 23/04 348/734 |
| 2014/0208267 A1 | 7/2014 | Kim et al. | |
| 2014/0240609 A1 | 8/2014 | Choi et al. | |
| 2015/0229865 A1* | 8/2015 | Suzuki | G08C 19/28 348/734 |
| 2016/0150269 A1 | 5/2016 | Kim et al. | |

FOREIGN PATENT DOCUMENTS

| | | |
|---|---|---|
| KR | 10-2009-0121065 | 11/2009 |
| KR | 10-2011-0024272 | 3/2011 |
| KR | 10-1126705 | 3/2012 |
| KR | 10-1489810 | 2/2015 |
| KR | 10-1489811 | 2/2015 |
| KR | 10-2016-0016410 | 2/2016 |

OTHER PUBLICATIONS

Extended Search Report dated Jan. 10, 2018 in counterpart European Patent Application No. 17183818.8.

* cited by examiner

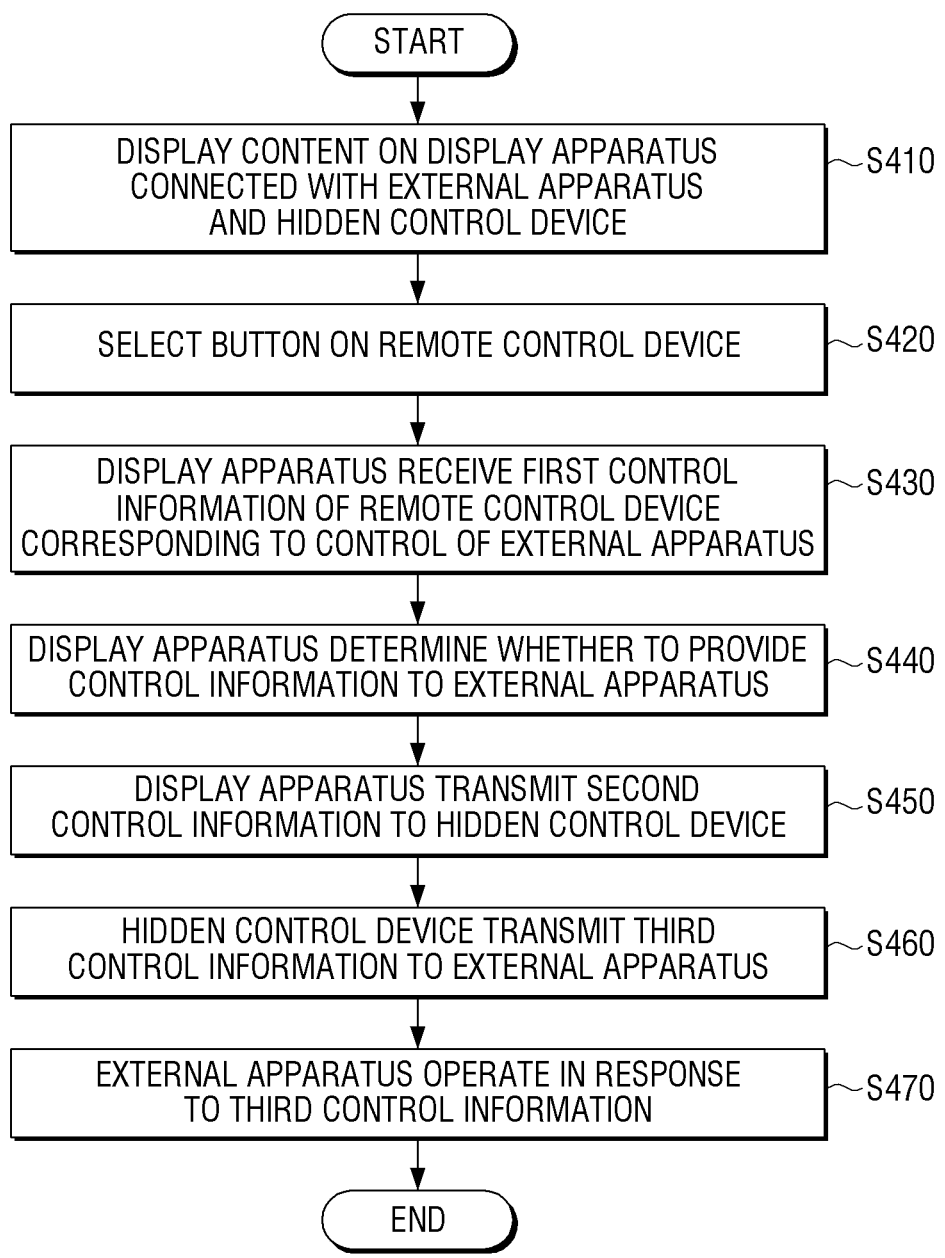

FIG. 5C
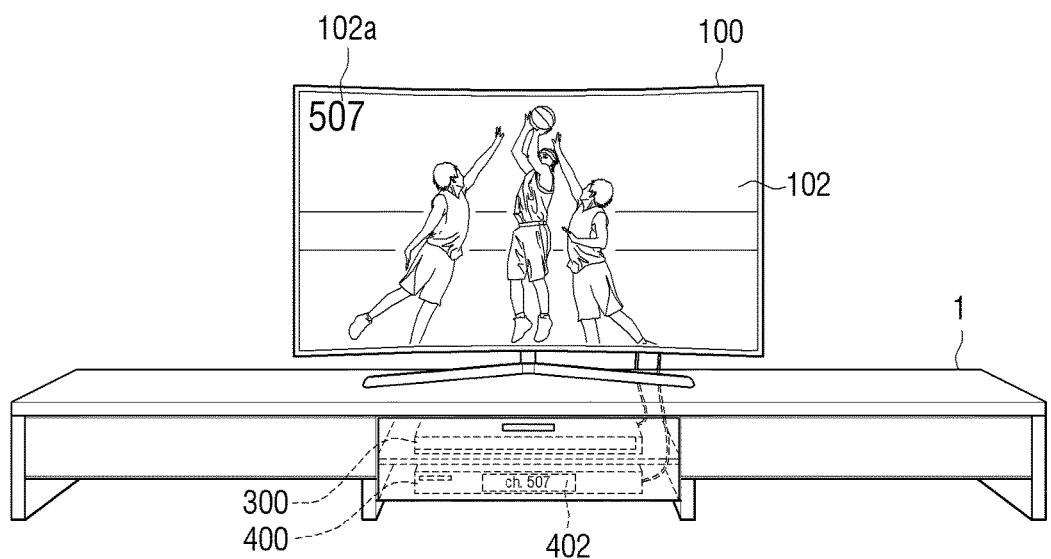
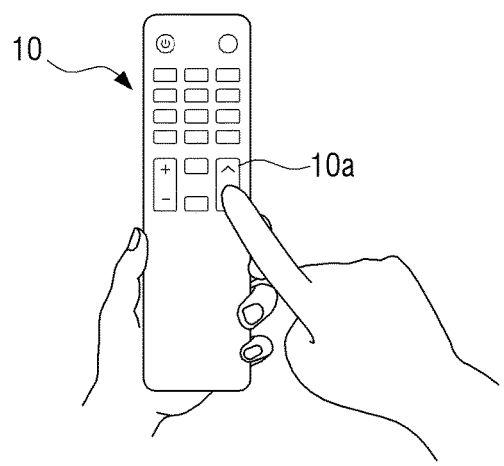

DISPLAY APPARATUS AND METHOD FOR CONTROLLING OF DISPLAY APPARATUS

CROSS-REFERENCE TO RELATED APPLICATION

This application is based on and claims priority under 35 U.S.C. § 119 to Korean Patent Application No. 10-2016-0109856, filed in the Korean Intellectual Property Office on Aug. 29, 2016, the disclosure of which is incorporated by reference herein in its entirety.

BACKGROUND

1. Field

The present disclosure relates generally to a display apparatus and a control method thereof, for example, to a display apparatus which controls a hidden device that cannot be controlled by a remote control device and a control method thereof.

2. Description of Related Art

A remote control device is often used as an interface between a display apparatus that can output not only a broadcast but also a content, and a user. Also, a user voice or a user motion can be used as an interface between a display apparatus and a user.

With the development of technology, the functions of a display apparatus have been diversified (for example, executing various applications, games, etc.), and a display apparatus can be connected with various external apparatuses (e.g., a set-top box, a DVD player, etc.) to operate.

In the case where an external apparatus connected with a display apparatus is stored inside furniture considering an interior design, a nearby display apparatus may unnecessarily receive an optical signal output from a remote control device used for an external apparatus.

SUMMARY

According to an example embodiment, a display apparatus is provided, the display apparatus including a display, an optical receiver comprising optical receiving circuitry, an input/output unit comprising input/output circuitry configured to be connected with a hidden control device via cable and a processor configured to control the display, the optical receiver and the input/output unit, wherein the processor may be configured to analyze first control information for a hidden external apparatus received from the remote control device through the optical receiver and to transmit second control information corresponding to control of the hidden external apparatus to the hidden control device through the input/output unit.

According to an example embodiment, the display apparatus may include a display and a control device that is in a housing separate from the display and is connected with the display via cable, the control device comprising an optical receiver comprising optical receiving circuitry, an input/output unit comprising input/output circuitry configured to output second control information, a light source driver configured to drive a light source of the display, a power supply configured to supply power to the display, a serial transceiver configured to communicate with the display in serial communication and a processor configured to control the display, the light source driver, the power supply and the serial transceiver, wherein the control device may be configured to analyze first control information for the hidden external apparatus received from a remote control device through the optical receiver and to transmit second control information corresponding to control of the hidden external apparatus to a hidden control device through the input/output unit via the cable, and wherein the control device may be configured to be exposed.

A method for controlling a display apparatus is also provided, the method including displaying a content on a display apparatus connected to an external apparatus and a hidden control device, receiving first control information which controls the external apparatus from a remote control device through an optical receiver, determining whether to provide control information to the external apparatus by analyzing the first control command and transmitting second control information generated in response to the analysis result to the hidden control device through an input/output unit, wherein the external apparatus and the hidden control device may be configured to be hidden.

A display apparatus which can control a hidden external apparatus hidden such that the external apparatus cannot be controlled by an exclusive remote control device and a control method thereof may be provided.

A display apparatus which can determine whether to provide control information to a hidden external apparatus such that the external apparatus cannot be controlled by an exclusive remote control device and a control method thereof may be provided.

A display apparatus which can convert first control command received based on whether an external apparatus is hidden such that the external apparatus cannot be controlled by an exclusive remote control device and a control method thereof may be provided.

A display apparatus which may control a hidden external apparatus hidden such that the external apparatus cannot be controlled by an exclusive remote control device, by using an hidden control device connected through the input/output unit and a control method thereof may be provided.

The present disclosure is not limited to the aforementioned examples, but according to various example embodiments, an exposed display apparatus which can control a hidden external apparatus hidden such that the external apparatus cannot be controlled by an exclusive remote control device and a control method thereof may be provided.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 4 is a flowchart illustrating an example method for controlling a display apparatus according to an example embodiment; and FIGS. 5A, 5B, 5C and 5D are diagrams illustrating examples of a method for controlling a display apparatus according to an example embodiment.

DETAILED DESCRIPTION

Figure 1:
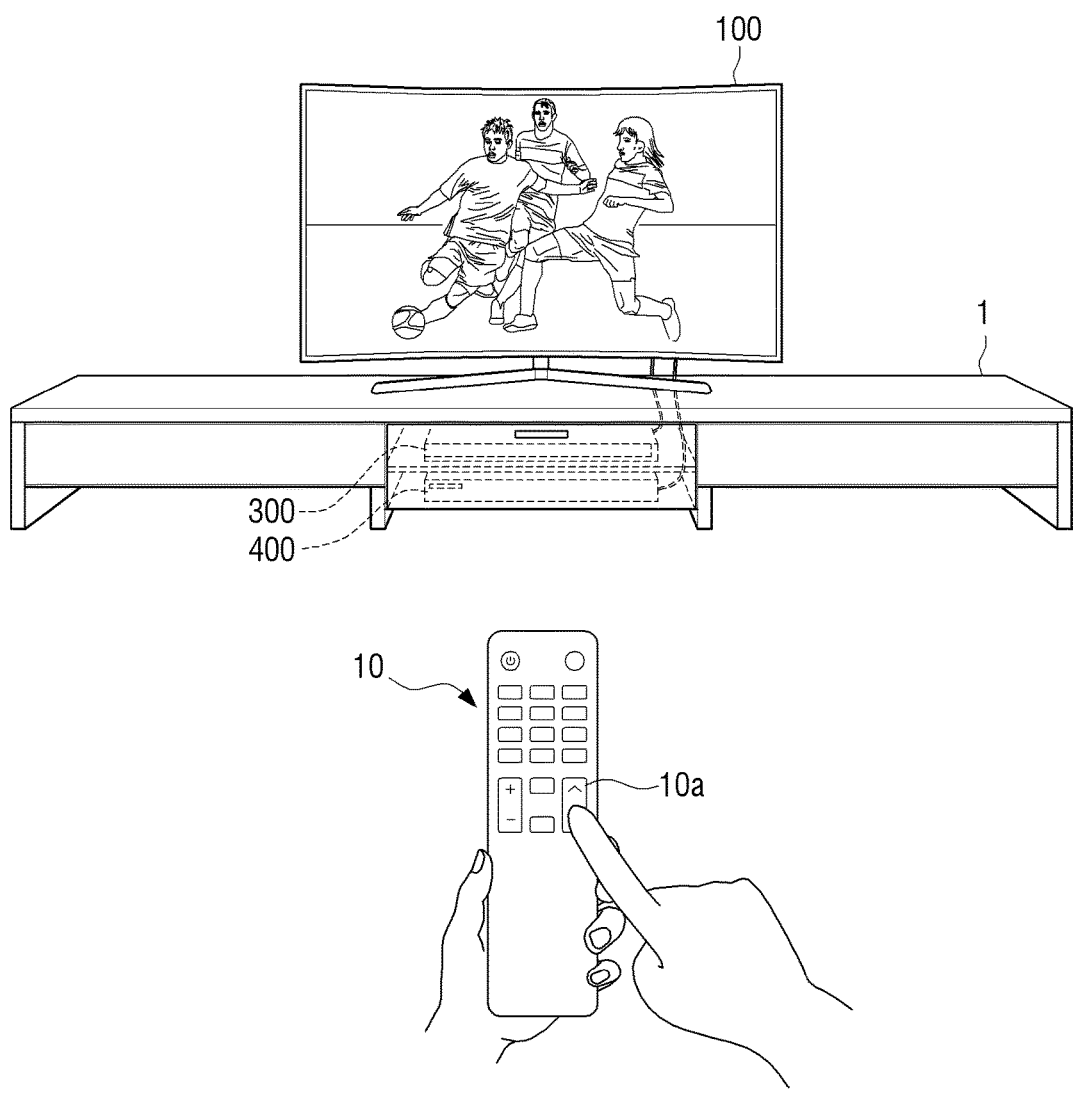
FIG. 1 is a diagram illustrating an example operation between a display apparatus, a hidden control device and an external apparatus according to an example embodiment.

Hereinafter, the terms used in the example embodiments will be briefly described before describing the various example embodiments in greater detail. Further, the same reference numerals or symbols used in the drawings accompanying the disclosure refer to components or elements that perform substantially the same or similar functions.

The terms "first", "second", etc. may be used to describe diverse components, but the components are not limited by the terms. The terms are only used to distinguish one component from the others. For example, a first element may be named a second element without departing from the scope of right of the various example embodiments of the present disclosure, and similarly, a second element may be named a first element. The term 'and/or' includes a combination of a plurality of related items or one of the plurality of related items.

In the example embodiment, the term "button (or key) selection" on a remote control device (10, referring to FIG. 1) may refer, for example, 'pressing or touching a button (or key).' Also, the term "user input" may refer, for example, to 'a button (or key) selection by a user,' 'a button (or key) press by a user,' 'a button touch by a user,' 'a touch gesture of a user,' 'a user voice' or 'a user motion' (e.g., shaking a remote control device, etc.).

In the example embodiment, the term "a screen of a display apparatus" may refer to a display of a display apparatus.

In an example embodiment, a control command may correspond to a button (or key) which receives an input, e.g., a user input. For example, the control command corresponding to a power button (key) may refer to 'powering on/off' of a display apparatus 100. The control command corresponding to a volume button (key) may refer to 'volume up/down' in the display apparatus 100. Also, the control command corresponding to a channel button (key) may refer to 'channel increase/decrease' in the display apparatus 100.

In an example embodiment, an external apparatus may be controlled by unidirectional control information output from the remote control device. The external apparatus may be controlled by control information (e.g., IR pulse) output through an optical output unit (outputting, for example, infrared light) of the remote control device. The output IR pulse may, for example, have a frequency range from several tens of kHz to several hundreds of kHz.

The control information received from the remote control device may refer to a control command (e.g., an IR signal corresponding to a button) received from the remote control device. The control information may be output through the optical output unit (e.g., including optical output circuitry) of the remote control device in a form of, for example, binary code. The remote control device may have a remote control data format which corresponds to a manufacturing company and/or an electronic apparatus (e.g., a display apparatus, a set-top box, home appliances, a speaker, an audio apparatus, etc.). The remote control data format may vary depending on a manufacturing company and/or the type of an electronic apparatus.

The terms used in the disclosure are provided to explain various example embodiments, and not to limit the present disclosure. A singular term includes a plural form unless otherwise indicated. The terms "include," "comprise," "is configured to," etc. in the description are used to indicate the presence of features, numbers, steps, operations, elements, parts or combination thereof, and do not exclude the possibilities of combination or addition of one or more features, numbers, steps, operations, elements, parts or combination thereof.

The same reference numerals or symbols used in the drawings refer to components or elements that perform substantially the same functions.

FIG. 1 is a diagram illustrating an example operation between a display apparatus, a hidden control device and an external apparatus according to an example embodiment.

FIG. 1 illustrates a display apparatus 100, a hidden control device 300, a hidden external apparatus 400 and a remote control device 10. A user may control the hidden external apparatus 400 by selecting a button (or a key; for example, a channel increase button, 10a) on the remote control device 10.

The display apparatus 100 may be positioned on a furniture 1 placed indoors. The hidden control device 300 and the hidden external apparatus 400 which are not visible from outside may be positioned inside the furniture 1 (for example, inside a drawer, etc.). The remote control device 10 may be an exclusive remote control device which remotely controls the hidden external apparatus 400.

The hidden external apparatus 400 may be an electronic apparatus controlled by the remote control device (e.g., the exclusive or the universal remote control device) that can control the display apparatus 100. The hidden external apparatus 400 may include, for example, a set-top box (STB), a DVD player, a Blu-ray player or a speaker (connected with the display apparatus 100 via cable or wirelessly), or the like, but is not limited thereto.

The display apparatus 100 may be configured to be exposed (for example, configured to be visible to a user and to receive control information of the remote control device). The external apparatus 400 may be configured to be hidden (for example, configured to be not visible to a user or to be difficult to receive control information of the remote control device). The hidden control device 300 may be configured to be exposed or to be hidden.

The environment in which the external apparatus 400 is hidden may be such that the external apparatus 400 cannot receive the control information output from the remote control device (for example, the external apparatus 400 may receive the control information one time or less than one time when the control information is output from the remote control device ten times).

The above-described external apparatus 400 is one example, and the external apparatus 400 may be implemented by any electronic apparatus that is electrically connected with the display apparatus 100 and that can be controlled by the exclusive (or universal) remote control device.

The hidden control device 300 may be electrically connected with the display apparatus 100 and control the external apparatus 400. The hidden control device 300 may output the control information received from the display apparatus 100 to the inside of the furniture 1. The hidden control device 300 may output the control information received from the display apparatus 100 via cable or wirelessly (e.g., a near field communication method) to the hidden external apparatus 400.

Figure 2A:
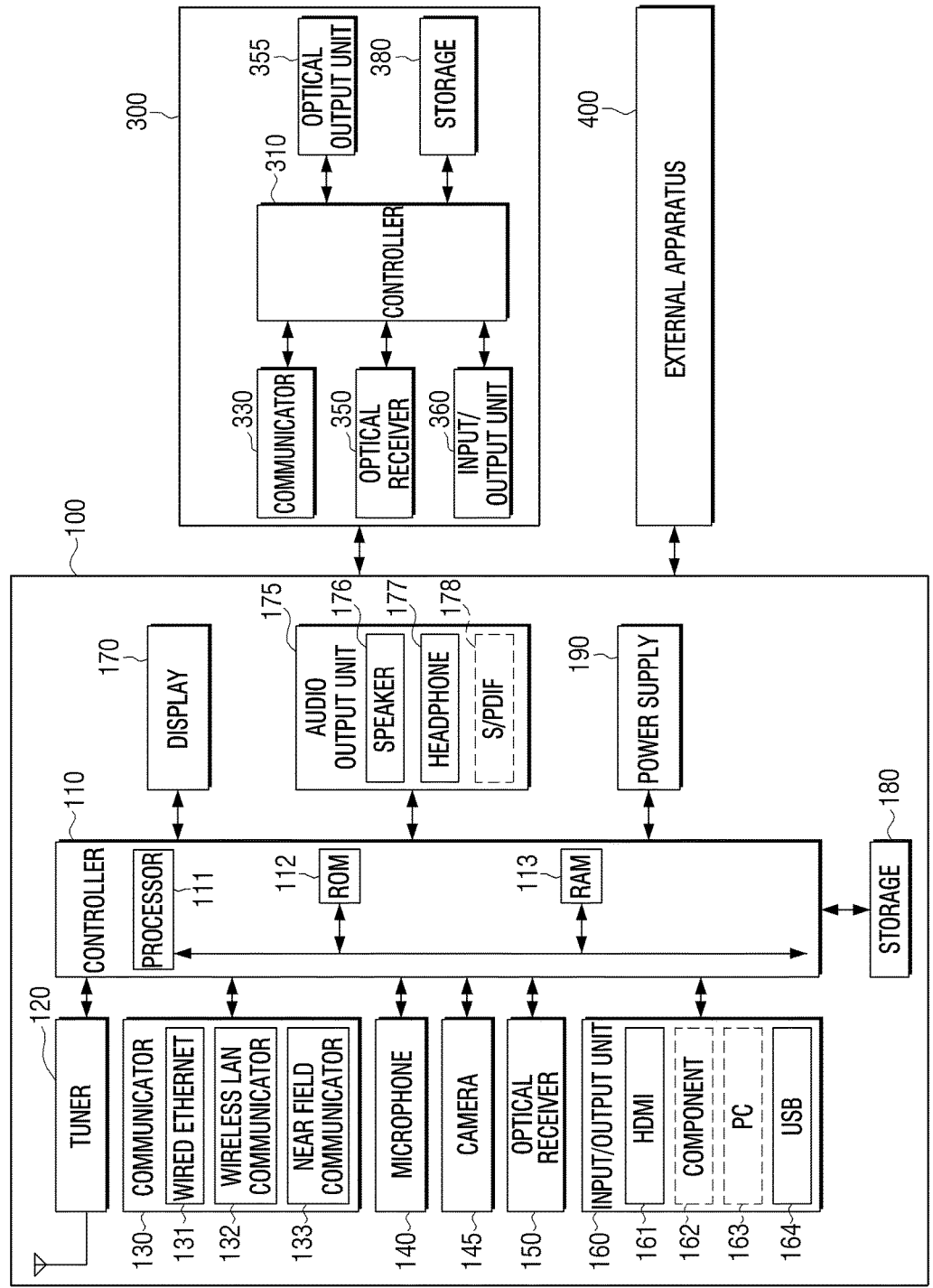
FIGS. 2A, 2B and 2C are block diagrams illustrating examples of a display apparatus, a hidden control device and an external apparatus according to an example embodiment.
Figure 2B:
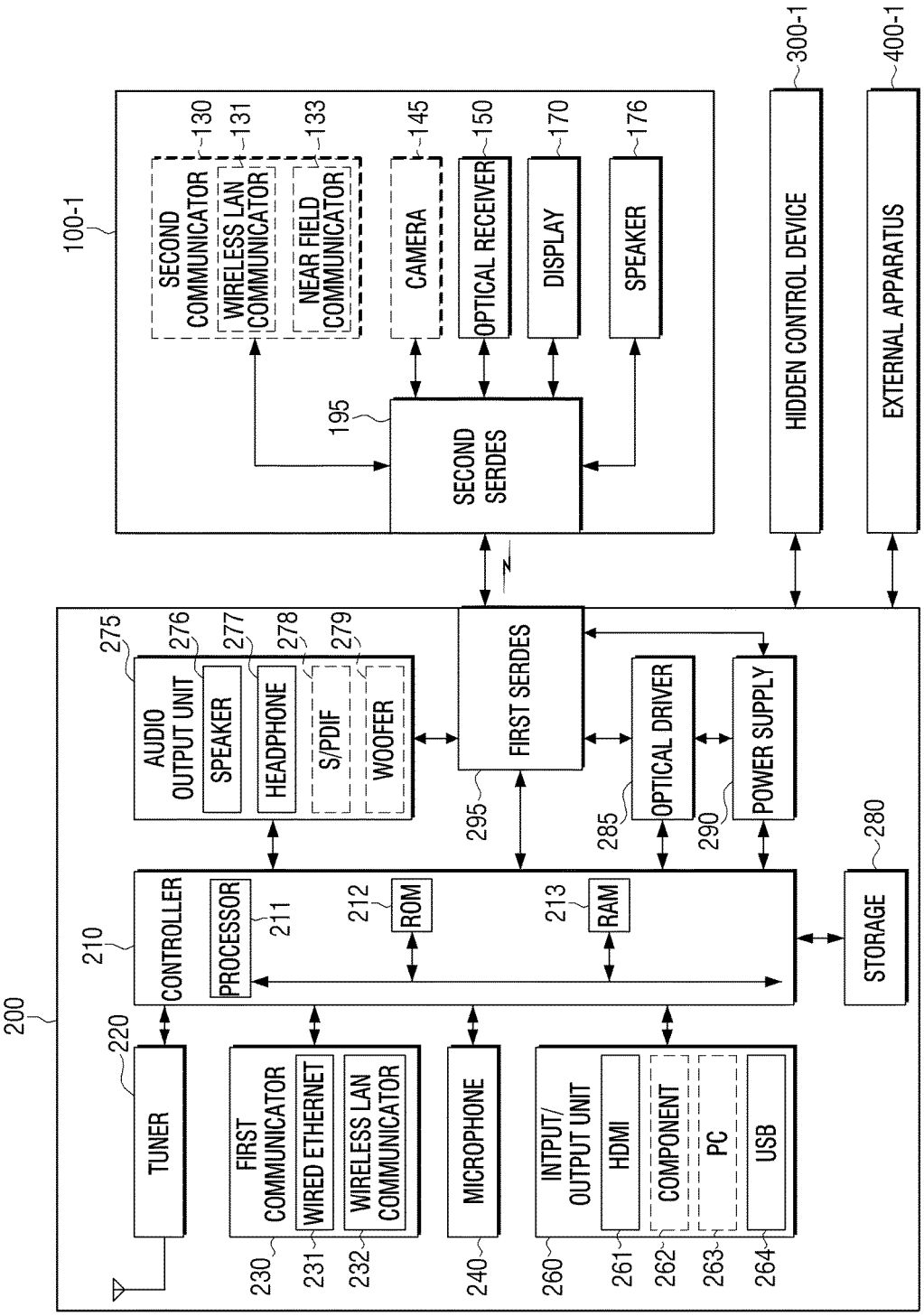
Figure 2C:
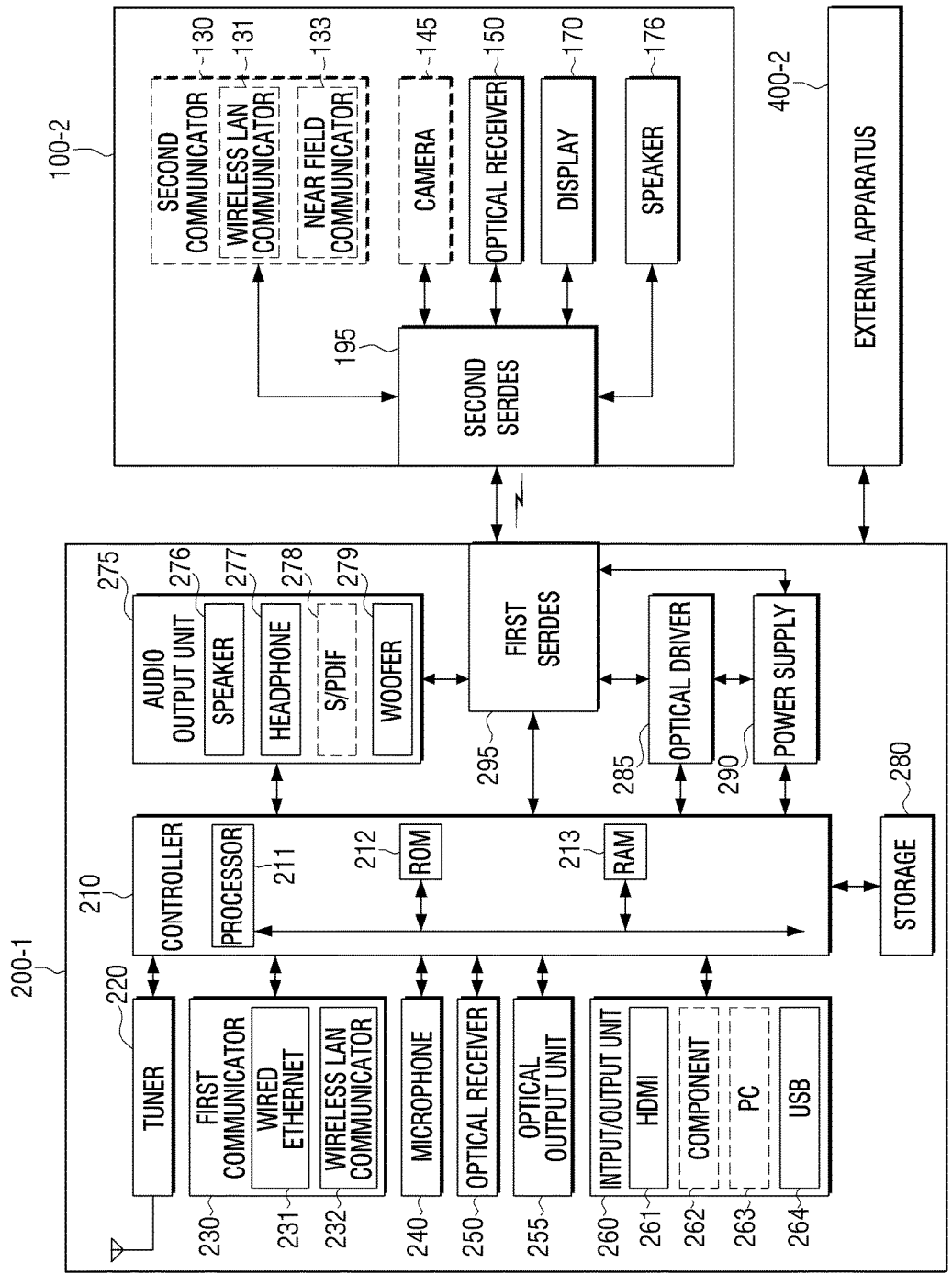

FIGS. 2A, 2B and 2C are block diagrams illustrating examples of the display apparatus, the hidden control device and the external apparatus according to an example embodiment.

Referring to FIGS. 2A to 2C, the display apparatus 100 which receives control information from the remote control device 10 may be connected with the external apparatus 400 using a communicator (e.g., including communication circuitry) 130 or an input/output unit (e.g., including input/output circuitry) 160 via cable or wirelessly.

The display apparatus 100 may include a display 170, and may further include one or more of a tuner 120, the communicator (e.g., including communication circuitry) 130 and the input/output unit (e.g., including input/output circuitry) 160. The display apparatus 100 may include the display 170, and may further include the combination of the tuner 120, the communicator 130 and the input/output unit 160. Also, the display apparatus 100 having the display 170 may be electrically connected with a separate electronic apparatus having a tuner.

The display apparatus 100 may be implemented by, for example, an analog TV, a digital TV, a 3D TV, a smart TV, an LED TV, an OLED TV, a plasma TV, a monitor, a curved TV having a screen (or a display) with a fixed curvature, a flexible TV having a screen with a fixed curvature, a bended TV having a screen with a fixed curvature, and/or a curvature changeable TV wherein a current curvature of a screen may be changed by a received user input, or the like, but is not limited thereto.

The display apparatus 100 may include a controller (e.g., including processing circuitry) 110, the tuner 120, the communicator 130, a microphone 140, a camera 145, an optical receiver (e.g., including optical receiving circuitry) 150, the input/output unit 160, a display 170, an audio output unit (e.g., including audio output circuitry) 175, a storage 180 and a power supply 190. The display apparatus 100 may further include a sensor (e.g., an illumination sensor, a temperature sensor, etc., not shown) which detects an internal state or an external state of the display apparatus 100.

The controller 110 may include various processing circuitry and control overall operations of the display apparatus 100 and a signal flow between the display apparatus 100 and the internal components (110 to 190), and process data. The controller 110 may control power supplied from the power supply 190 to the internal components (110 to 190).

The controller 110 may include for example, and without limitation, a processor 111, a ROM (or a non-volatile memory, 112) in which a control program for controlling the display apparatus 100 is stored and a RAM (or a volatile memory 113) which stores a signal or data input from the outside of the display apparatus 100 or which is used as a storage area corresponding to various operations performed in the display apparatus 100.

The processor 111 may further include a graphic processor for processing an image or a video. The graphic processor may be provided in the processor 111 as all-in-one type or may be implemented as a separate component. The processor 111 may be implemented as a system-on-chip (SoC) including a core and a graphic processor. The processor 111 may also be implemented as an SoC including at least one of a ROM 112 and a RAM 113.

The processor 111 may include a main processor and a sub processor which operates in a screen-off mode (or a power-off mode) and/or a preparation mode that is one of the states of the display apparatus 100. The processor 111 may further include a sensor processor which controls a sensor. The processor 111 may include various processing circuitry, such as, for example, and without limitation, one or more of a dedicated processor, a central processing unit (CPU), a controller, an application processor (AP), a communication processor (CP), an ARM processor, or may be defined by a corresponding term. Further, the processor 150 may be implemented as a digital signal processor (DSP), a SoC with a content processing algorithm embedded therein, or as a form of a field programmable gate array (FPGA).

The processor 111, the ROM 112 and the RAM 113 may be connected with one another through an internal bus.

In the example embodiment, the term "a controller of the display apparatus 100" may refer, for example, to the processor 111, the ROM 112 and the RAM 113 of the display apparatus 100. Also, in the example embodiment, the term "a controller of the display apparatus 100" may refer to the processor 111 of the display apparatus 100. The term "a controller of the display apparatus 100" may also refer to the main processor, the sub processor, the ROM 112 and the RAM 113 of the display apparatus 100.

The configuration and operations of the controller 110 may be implemented in various ways according to example embodiments.

With regard to a broadcast signal received via cable or wirelessly, the tuner 120 may tune and select the frequency of a channel that the display apparatus 100 intends to receive from among a plurality of wave components through amplification, mixing, resonance or the like of the received broadcast signal. The broadcast signal may include a video, an audio and additional data (e.g., electronic program guide [EPG]). The tuner 120 may receive a broadcast signal from various sources such as terrestrial broadcasting, cable broadcasting, satellite broadcasting, internet broadcasting and the like.

The tuner 120 may be provided in the display apparatus 100 as all-in-one type, or may be implemented as a separate tuner electrically connected with the display apparatus 100. The tuner 120 may also be implemented by an external apparatus (e.g., a set-top box 400 or an one-connect) having a tuner.

The communicator 130 may include various communication circuitry and connect the display apparatus 100 with the remote control device 10 or the external apparatus 400 under the control of the controller 110. The communicator 130 may receive the control information transmitted from the remote control device 10 or transmit the received control information to outside (for example, to the hidden control device 300) by control of the controller 110. The communicator 130 may download an application from an external source or perform web-browsing by control of the controller 110.

The communicator 130 may include various communication circuitry, such as, for example, and without limitation, one or more of a wired Ethernet 131, a wireless LAN communicator (e.g., including wireless LAN circuitry) 132 and a near field communicator (e.g., including near-field communication circuitry) 133 according to the performance and structure of the display apparatus 100.

The wireless LAN communicator 132 may be connected with an access point (AP) wirelessly by control of the controller 110. The wireless LAN communicator 132 may include, for example, Wi-Fi, and support the wireless LAN standard (IEEE802.11x) of Institute of Electrical and Electronics Engineers (IEEE).

The near field communicator 133 may perform near field communication with the remote control device 10 or the external apparatus 300 and 400 wirelessly without an AP by control of the controller 110. The near field communication may include, for example, and without limitation Bluetooth, Bluetooth low energy, infrared data association (IrDA), Ultra-Wideband (UWB) or near field communication (NFC) or the like.

The microphone 140 may receive an uttered user voice. The microphone 140 may convert the received voice into an electrical signal and output the electrical signal to the controller 110. The microphone 140 may be provided in the display apparatus 100 as 'all-in-one' type or may be implemented as a separate component. The separated microphone 140 may be electrically connected with the display apparatus 100 through the communicator 130 or the input/output unit 160.

A camera 145 may photograph a video (e.g., consecutive frames) corresponding to a user motion within a recognition range of the camera. The user motion may include a part of user body or a motion of a part of user body such as a presence of a user and a face, a facial expression, a hand, a first and a finger of a user. The camera 145 may be positioned in one of the upper end, the lower end, the left or the right.

The controller 110 may analyze photographed consecutive frames and recognize a user motion. The controller 110 may display a guide or a menu on the display apparatus 100 using the motion recognition result or perform control operation (e.g., channel control or volume control) corresponding to the motion recognition result.

If a plurality of cameras 145 are present, a three-dimensional still image or a three-dimensional motion may be received. The camera 145 may be separated from the display apparatus 100. The separated camera (or an electronic apparatus including a camera) may be electrically connected with the display apparatus 100 through the communicator 130 or the input/output unit 260.

The optical receiver 150 may include various optical receiving circuitry to receive an optical signal (including a control signal) output from the remote control device 10 through an optical window. The received optical signal may be transmitted to the controller 110.

The optical receiver 150 may receive an optical signal corresponding to a user input (e.g., a touch, a press, a touch gesture, a voice or a motion) from the remote control device 10. Control information may be obtained from the received optical signal.

The input/output unit 160 may include various input/output circuitry and receive a content from the outside of the display apparatus 100 under control of the controller 110. The content may include, for example, a video, an image, text or web document.

The input/output unit 160 may include various input output circuitry, such as, for example, and without limitation, one or more of a high-definition multimedia interface port 161 (HDMI input port), a component input jack 162, a PC input port 163 and a USB input jack 164. The input/output unit 160 may be added, removed and/or changed according to the performance and structure of the display apparatus 100.

The display 170 may display a video included in a broadcast signal received through the tuner 120 by control of the controller 110. The display 170 may display a content (e.g., a music video) input through the communicator 130 or the input/output unit 160. The display 170 may output a content stored in the storage 180 by control of the controller.

The display 170 may display a voice user interface (UI) for performing a voice recognition task corresponding to a voice recognition or a motion user interface (UI) for performing a motion recognition task corresponding to a motion recognition. For example, the voice UI may include a voice command word guide (e.g., recommendation voice data or a recommendation guide), and the motion UI may include a motion command word guide.

A screen of the display apparatus 100 according to an example embodiment may include the display 170 of the display apparatus 100.

The display 170 according to an example embodiment may display a visual feedback corresponding to an operation change of the external apparatus 400 by control of the controller 110.

The display 170 according to another example embodiment may be separated from the display apparatus 100. The display 170 may also be electrically connected with the display apparatus 100 through the input/output unit 160 of the display apparatus 100.

The audio output unit 175 may output an audio included in a broadcast signal received through the tuner 120 by control of the controller 110. The audio output unit 175 may output an audio (e.g., corresponding to a voice or sound) input through the communicator 130 or the input/output unit 160. The audio output unit 175 may also output an audio file stored in the storage 180 by control of the controller 110.

The audio output unit 175 may include various audio output circuitry, such as, for example, and without limitation, one or more of a speaker 176, a headphone output terminal 177 or an S/PDIF output terminal 178 or the combination of the speaker 176, the headphone output terminal 177 and the S/PDIF output terminal 178.

The audio output unit 175 according to an example embodiment may output an auditory feedback corresponding to an operation change of the external apparatus 400 by control of the controller 110 of the display apparatus 100.

The storage 180 may store various data, programs or applications for driving and controlling the display apparatus 100 by control of the controller 110. The storage 180 may store a signal or data that is input and output in response to driving of the tuner 120, the communicator 130, the microphone 140, the camera 145, the optical receiver 150, the input/output unit 160, the display 170, the audio output unit 175 and the power supply 190.

The storage 180 may store a control program for controlling the display apparatus 100 and the controller 110, an application firstly provided from a manufacturing company or downloaded from an external source, a graphical user interface (hereinafter, referred to as a GUI, including a UI) related to an application, an object (e.g., image text, an icon, a button) for providing a GUI, user information, document, a voice database, a motion database or related data.

The storage 180 may include a broadcast reception module, a channel control module, a volume control module, a communication control module, a voice recognition module, a motion recognition module, an optical reception module, a display control module, an audio control module, an external input control module, a power control module, a voice database (DB) or a motion database (DB).

The modules and databases which are not illustrated in the storage may be implemented as a form of software comprising program elements in the display apparatus 100 to perform a control function in broadcast reception, a channel control function, a volume control function, a communication control function, a voice recognition function, a motion recognition function, an optical reception control function, a display control function, an audio control function, an external input control function or a power control function. The controller 110 may perform an operation and/or a function of the display apparatus 100 using the software stored in the storage 180.

The storage 180 may store a remote control data format of the display apparatus 100. The storage 180 may also store a remote control data format of the external apparatus 400.

The storage 180 may store received first to third control commands. The storage 180 may store first hidden apparatus control information.

The storage 180 may store a video, an image or text corresponding to a visual feedback.

The storage 180 may store sound corresponding to an auditory feedback.

The storage 180 may store a feedback provision time (e.g., 300 ms) of a feedback provided to a user.

The term "storage" in the example embodiment may refer to the storage 180, the ROM 112 of the controller 110, the RAM 113, a storage implemented as a SoC, a memory card (e.g., a micro SD card and a USB memory) provided in the display apparatus 100 or an external storage medium (e.g., a USB memory) which can be connected with the USB port 164 of the input/output unit 160. The storage may also include a non-volatile memory, a volatile memory, a hard disk drive (HDD) or a solid state drive (SSD).

The power supply 190 may provide power input from an external power source to the internal components 110 to 190 of the display apparatus 100 by control of the controller 110. The power supply 190 may provide power input from one or more than one batteries provided inside the display apparatus 100 to the components 110 to 190 by control of the controller 110.

With regard to the components (e.g., 110 to 190) illustrated in the display apparatus 100 in FIGS. 1 and 2A, at least one of the components can be added, changed or removed (e.g., at least one of the boxes illustrated in dotted lines) according to the performance and/or the type of the display apparatus 100. Further, the positions of the components (e.g., 10 to 190) may be changed according to the performance and/or the type of the display apparatus 100.

Hereinafter, an example embodiment of controlling a screen of a display apparatus may be described with reference to examples.

Referring to FIG. 1, the remote control device 10 which remotely controls the external apparatus 400 may include a controller, a communicator, an input unit, an optical output unit, a display, a storage and a power supply. The remote control device 10 may include one or both of the communicator and the optical output unit.

The term 'remote control device 10' may refer, for example, to an electronic apparatus which can remotely control the external apparatus 400. The remote control device 10 may include an electronic apparatus in which an application for controlling the external apparatus 400 can be installed (or can be downloaded from an external source).

The electronic apparatus having the above-described display may include a cell phone, a smartphone, a tablet PC, a laptop, other display apparatuses or electronic appliances (a refrigerator, a washing machine or a vacuum cleaner), or the like, but is not limited thereto.

A user may control the display apparatus 100 using a button (e.g., a channel change button) displayed on a graphic user interface (GUI) provided from an executed application.

The remote control device 10 may transmit a control signal (e.g., a control signal corresponding to channel change or a control signal corresponding to volume change) corresponding to a user input (e.g., a touch, a press, a touch gesture, a voice or a motion) through one of the communicator and the optical output unit to the external apparatus 400 which is a control object.

The communicator of the remote control device 10 is substantively similar to the communicator 130 of the display apparatus 100, and thus, the overlapped description will not be repeated.

The optical output unit of the remote control device 10 may output an optical signal (e.g., including a control signal) corresponding to a user input (e.g., a touch, a press, a touch gesture, a voice or a motion). The optical signal may be received in the optical receiver of the external apparatus 400. It may be difficult for the optical receiver of the hidden external apparatus 400 to receive an optical signal. Also, the optical signal output from the optical output unit of the remote control device 10 may be received in the optical receiver 150 of the display apparatus 100.

A remote controller code format (a remote control data format or a remote control code format) used in the remote control device 10 may use one of an exclusive remote controller code format that is exclusively used by a manufacturing company (e.g., a manufacturing company of the external apparatus 400) and a commercial (or universal) remote controller code format. The remote controller data format may be configured with, for example, information on the presence, timing, a particular form for performing a selected control and the number of repetition of a bit pattern, a bit timing, the number of remote controller code bits, a carrier frequency, a header or a lead pulse, a stop pulse or an end pulse and a tail purse.

In the case of an NEC code, the remote control data format may include a leader code (or a lead code) which indicates the start of remote control data and a data word. The data word may include an address code and a data code.

The aforementioned remote control data format may be one example, and the remote control data format may vary depending on a manufacturing company and/or an electronic apparatus.

The control signal may be stored in the storage or generated by the controller. The remote control device 10 may include an infrared-laser emitting diode (IR-LED).

The display may display a broadcast channel number displayed on the display apparatus 100, a broadcast channel name and/or a state (e.g., a screen-off or a normal mode), etc. of the display apparatus. The display may include, for example, a display using the method such as a liquid crystal display (LCD) method, an organic light emitting diodes (OLED) method or a vacuum fluorescent display (VFD) method, or the like, but is not limited thereto.

The storage may store various data, programs or applications for operating and controlling the remote control device 10. The storage may store a signal or data input or output in response to driving of the communicator, the optical receiver and the power supply.

The storage may store control information corresponding to a user input (e.g., a touch, a press, a touch gesture, a voice or a motion) received by control of the controller.

With regard to the components illustrated in the remote control device 10 in FIGS. 1 and 2A, at least one of the components may be added or removed according to the performance of the remote control device 10.

Figure 3A:
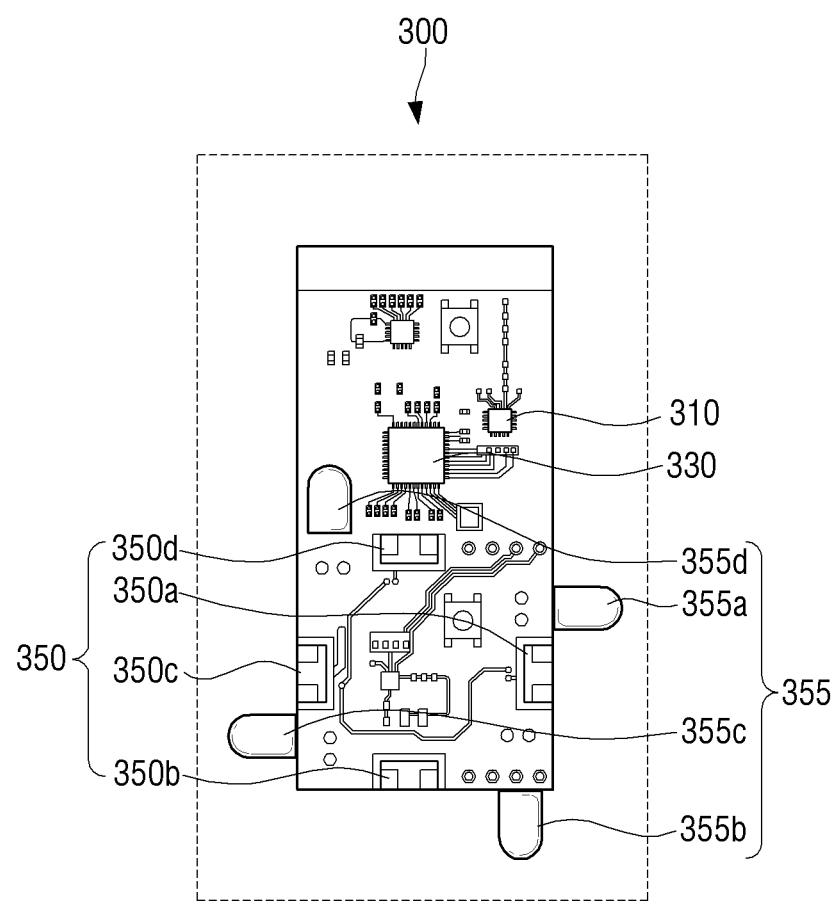
FIGS. 3A and 3B are schematic perspective views illustrating an example interior of a hidden control device according to an example embodiment.
Figure 3B:
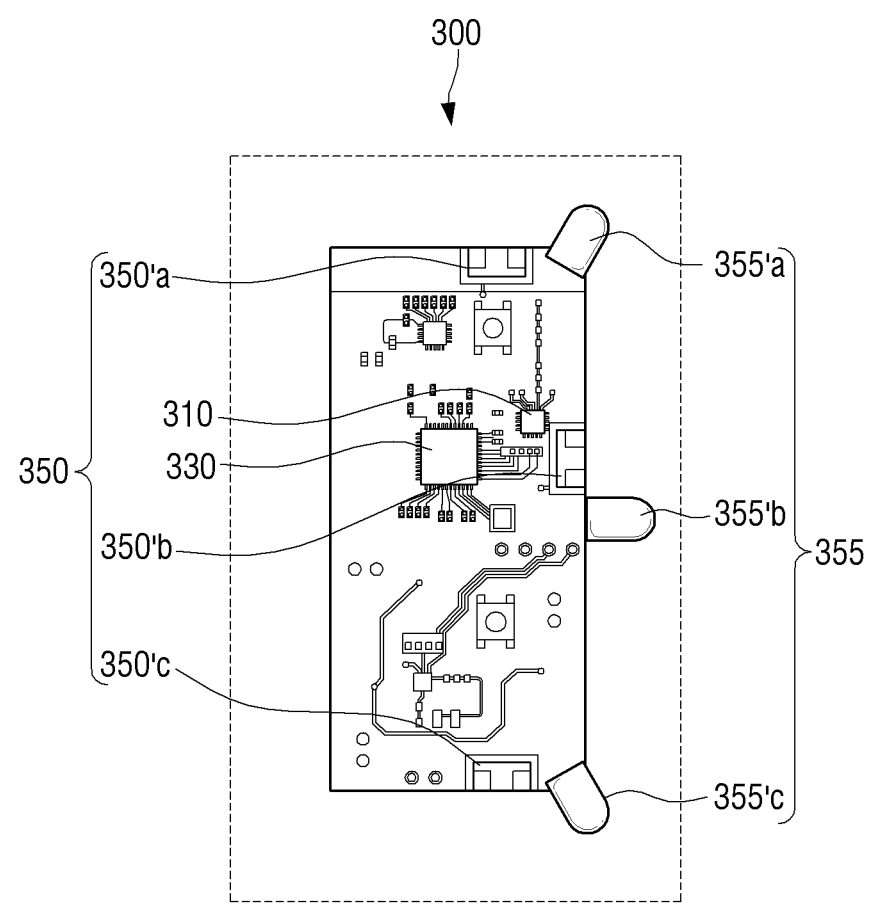

FIGS. 3A and 3B are schematic perspective views illustrating an example hidden control device according to an example embodiment.

Referring to FIGS. 1 to 3B, the hidden control device 300 may be hidden inside the furniture 1 together with the external apparatus 400. The hidden control device 300 may be connected with the display apparatus 100 via cable or wirelessly. The hidden control device 300 may include a controller (e.g., including processing circuitry) 310, a communicator (e.g., including communication circuitry) 330, an optical receiver (e.g., including optical receiving circuitry) 350, an optical output unit (e.g., including optical output circuitry) 355, an input/output unit (e.g., including input/ output circuitry) 360 (see, e.g., FIG. 2A) and a storage 380 (see, e.g., FIG. 2A). The hidden control device 300 may be provided with power from the display apparatus 100 or through a separate power supply.

The controller 310 may include various processing circuitry and control overall operations of the hidden control device 300 and a signal flow between the internal components 330 to 360, and process data. The controller 310 may control power supplied to the internal components 310 to 360.

The controller 310 may include a processor. For example, the processor may include a micro controller (or a low-power micro controller), or the like, but is not limited thereto.

The controller 310 may store control information received from the display apparatus 100 through the communicator 330 or the input/output unit 360 in the storage 380. The controller 310 may output the received control information as it is to the external apparatus 400 through the optical output unit 355 or convert the received control information and output the converted control information to the external apparatus 400 that is not exposed to the outside of the furniture 1 through the optical output unit 355.

The controller 310 may convert the received control information so that the control information can be output by the optical output unit 355.

The communicator 330 may be connected with the display apparatus 100 or the external apparatus 400 wirelessly. The communicator 330 may receive control information transmitted from the display apparatus 100 by control of the controller 310.

The communicator 330 is substantively similar to the communicator 130 of the display apparatus 100, and thus, the overlapped description will be omitted.

In the exposed environment, the optical receiver 350 may receive an optical signal (including control information) transmitted from the remote control device 10. The optical receiver 350 may be configured with a plurality of optical receivers (350a, 350b, 350c and 350d). The optical receiver 350 may output the received control information to the controller 310. In the hidden environment, it may be difficult for the optical receiver 350 to receive the control information transmitted from the remote control device 10.

The optical output unit 355 may output an optical signal to the external apparatus 400 by control of the controller 310. The optical output unit 355 may include a plurality of IR LEDs 355a to 355d.

In FIG. 3A, the plurality of IR LEDs 355a to 355d may be positioned in four directions in a predetermined degree (e.g., 90°, an error is equal to or less than ±3°, and possible to change). In another example embodiment (e.g., FIG. 3B), the IR LEDs 355a', 355b' and 355c' may be positioned in a predetermined degree (e.g., ±60°, an error is equal to or less than ±2°, and possible to change) with reference to one IR LED 355b.' In FIG. 3B, the IR LEDs 355a' to 355c' may be positioned in a predetermined degree (e.g., 60°, an error is equal to or less than ±2°, and possible to change) with reference to the front (e.g., opposite to the remote control device 10).

The input/output unit 360 (see, e.g., FIG. 2A) may be connected with the display apparatus 100 via cable. The input/output unit 360 may receive control information corresponding to control of the external apparatus 400 from the display apparatus 100 by control of the controller 310. The input/output unit 360 is substantively similar (e.g., only a difference in apparatus) to the input/output unit 160 of the display apparatus of the display apparatus 100, and thus, the overlapped description will not be repeated.

With regard to the components illustrated in the hidden control device 300 in FIGS. 1 to 3B, at least one of the components may be added or removed according to the performance of the hidden control device 300.

Referring to FIGS. 1 to 2C, the hidden external apparatus 400 may perform an operation (e.g., changing a channel) corresponding to received control information. The hidden external apparatus 400 may bypass the hidden control device 300 and perform an operation (e.g., changing a channel) corresponding to received control information. The controller of the hidden external apparatus 400 may also control the external apparatus 400 to operate in response to the received control information.

Referring to FIG. 2B that is another example embodiment, the display apparatus 100-1 may be electrically connected with a first control device 200 which controls the display apparatus 100-1. The control device 200 may be connected with the display apparatus 100-1 by a first serial transceiver 295, a second serial transceiver 195 and cable. The control device 200 may also be connected with the display apparatus 100-1 by an exclusive cable (e.g., one connect cable) which provides high-speed communication and supplies power.

In FIG. 2B, the display apparatus 100-1 and the first control device 200 may be configured to be exposed. The hidden control device 300 and the external apparatus 400 may be configured to be hidden. The first control device 200 may be electrically connected with the hidden control device 300 and the external apparatus 400.

The first serial transceiver 295 may transmit power, a control signal and/or data from the first control device 200 to the second serial transceiver 195 of the display apparatus 100-1 via cable by control of the controller 210.

As in FIG. 2B, if the control device 200 is connected with the display apparatus 100-1, some of the components of the display apparatus 100 illustrated in FIG. 2A may be included in the first control device 200. For example, the first control device 200 may include a controller 210, a tuner 220, a communicator 230, a microphone 240, an input/output unit 260, an audio output unit 275, a storage 280 and/or a power supply 295. The first control device 200 may also include a woofer 279.

The components 210 to 290 of the first control device 200 are substantively similar (e.g., only a difference in apparatus) to the components 110 to 190 of the display apparatus 100 which are illustrated in FIG. 2A. Thus, the overlapped description will not be repeated. Also, the first control device 200 may further include an optical source driver 285 which drives an optical source of the display 170 of the display apparatus 100 illustrated in FIG. 2A.

The display apparatus 100-1 connected with the first control device 200 may include some of the components of the display apparatus 100 illustrated in FIG. 2A. For example, the display apparatus 100-1 may include the display 170. The display apparatus 100-1 may also include one or the combination of the communicator 130, the camera 145, the optical receiver 150 and the speaker 176.

In FIG. 2B, the first control device 200 may be connected with the hidden control device 300-1 and the external apparatus 400-1 through the input/output unit 260 similarly to the display apparatus 100 illustrated in FIG. 2A. The first control device 200 may also be connected with the hidden control device 300-1 and the external apparatus 400-1 through the communicator 230.

In FIG. 2B, the hidden control device 300-1 and the external apparatus 400-1 which are connected with the first control device 200 are substantively similar to the hidden control device 300 and the external apparatus 400, and thus, the overlapped description will not be repeated.

The components 210 to 295 of the first control device 200 illustrated in FIG. 2B may be added, changed or removed according to the performance of the first control device 200 and/or the display apparatus 100-1.

Referring to FIG. 2C, the second control device 200-1 may be an 'all-in-one' type including the first control device 200 and the hidden control device 300.

In FIG. 2C, the display apparatus 100-2 and the second control device 200-1 may be configured to be exposed. The external apparatus 400 may be configured to be hidden. The second control device 200-1 may be electrically connected with the hidden external apparatus 400.

The components 210 to 290 of the second control device 200-1 illustrated in FIG. 2C are substantively similar to the components of the first control device 200 and of the hidden control device 300 which are illustrated in FIG. 2B, and thus, the overlapped description will not be repeated.

The first control device 200 may be substantively similar (e.g., addition of some of the components) to the second control device 200-1. Further, the display apparatuses 100, 100-1 and 100-2 may also be substantively similar (e.g., displaying a content and only a difference in components) to one another. The external apparatuses 400, 400-1 and 400-2 may be substantively similar to one another.

The second control device 200-1 may be connected with the external apparatus 400-2 through the input/output unit 260. The second control device 200-1 may also be connected with the external apparatus 400-2 through the communicator 230.

The components 210 to 295 of the second control device 200-1 illustrated in FIG. 2C may be added, changed or removed according to the performance of the second control device 200-1 and the display apparatus 100-2.

FIG. 4 is a flowchart illustrating an example method for controlling the display apparatus according to an example embodiment.

In operation S410 of FIG. 4, a content may be displayed on the display apparatus connected with the external apparatus and the hidden control device.

Figure 5A:
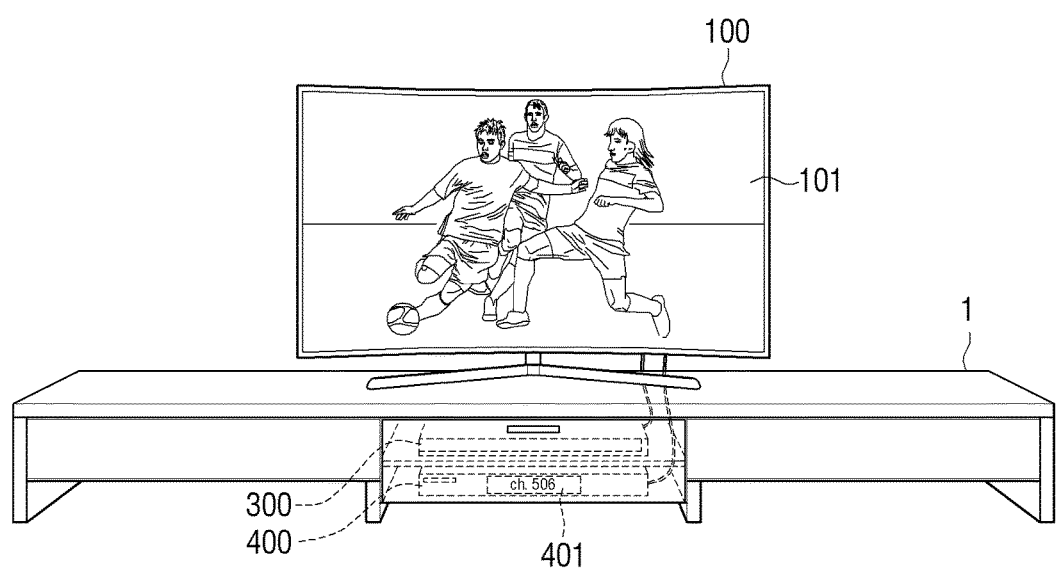

Referring to FIG. 5A, a content (e.g., a broadcast signal or a video, etc., 101) may be displayed on the display apparatus 100. The display apparatus 100 may be connected with the hidden control device 300 hidden in the furniture 1 via cable or wirelessly. The display apparatus 100 may be connected with the external apparatus 400 hidden in the furniture 1 via cable or wirelessly. The external apparatus 400 may be, for example, a set-top box, or the like, but is not limited thereto. A current channel number (e.g., 'Ch. 506,' 401) may be display on the front side of the external apparatus 400. It may be difficult to see the current channel number 401 displayed on the front side of the external apparatus 400 from outside.

The remote control device 10 may be an exclusive remote control device corresponding to the external apparatus 400.

The external apparatus 400 may be connected with the remote control device 10 wirelessly (e.g., at least one of a wireless LAN communicator 131 or a near field communicator 132). The exposed external apparatus 400 may receive an optical signal (e.g., an infrared signal) output from the remote control device 10. Also, it may be difficult for the hidden external apparatus 400 to receive an optical signal (e.g., an infrared signal) output from the remote control device 10.

In operation S420 of FIG. 4, a button on the remote control device may be selected.

Figure 5B:
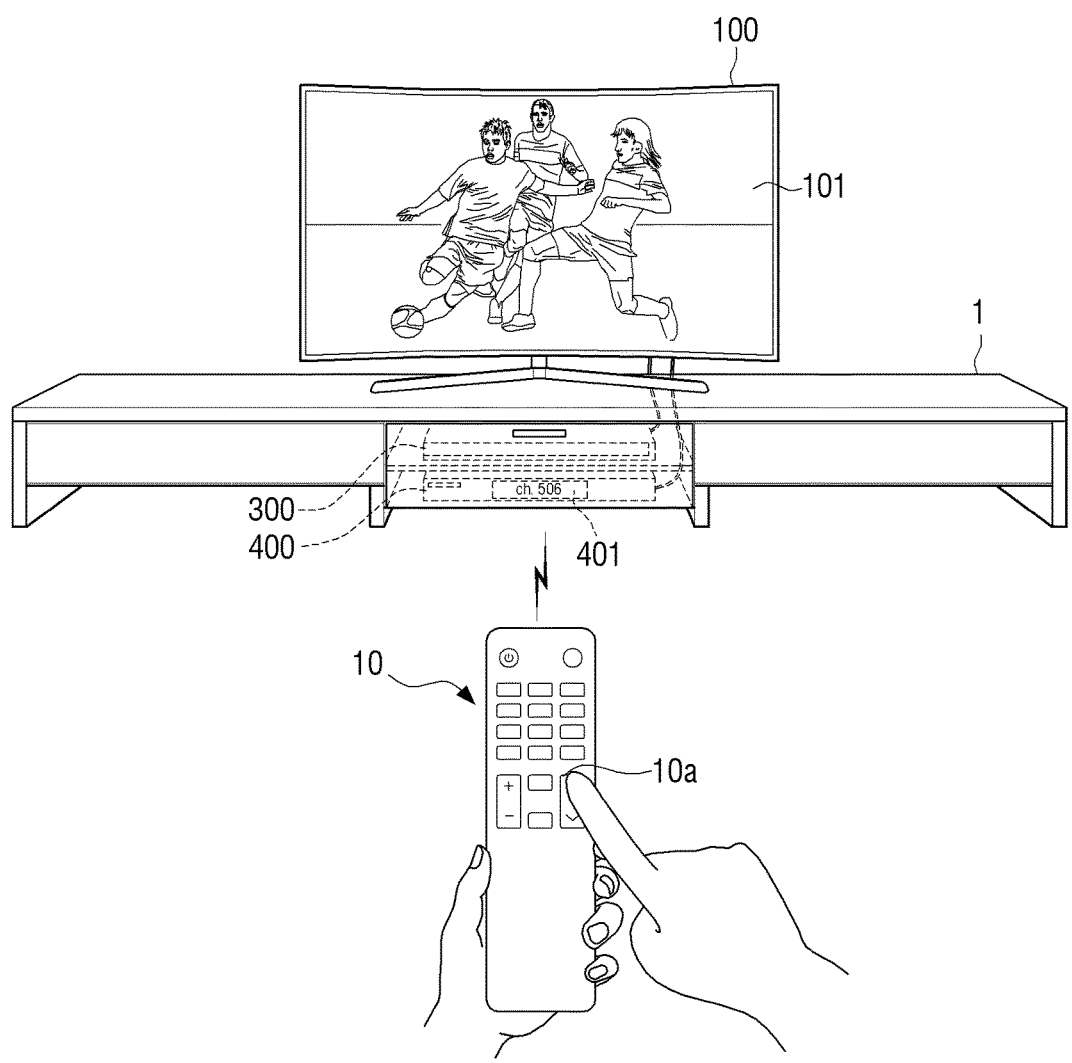

Referring to FIG. 5B, a user may select the button 10a on the remote control device 10. The button 10a may include a plurality of buttons provided on the remote control device 10, and the button 10a may be, for example, a channel button 10a. A user may change a channel of the display apparatus 100 by control of the external apparatus 400. The described button 10a is one example, and the button 10a may be any button selected by a user on the remote control device 10. The remote control device 10 may receive not only the button 10a but also a user input (e.g., shaking or a voice).

The remote control device 10 may transmit an optical signal (corresponding to first control information) corresponding to selection of the button 10a by a user. The first control information (an optical signal) may be the control information to control the display apparatus 100, not the control information to control the external apparatus 400.

The remote control device 10 may transmit the first control information to the external apparatus 400 through the optical output unit periodically (e.g., 45 ms to 113.7 ms, but varying depending on a manufacturing company and/or a product). The remote control device 10 may transmit the first control information periodically at a first period, a second period and/or a third period or more.

If the first control information is transmitted through the optical output unit, a user may maintain the selection of the button 10a during an established time. For example, the established time may be 2.5 secs to 4 secs (possible to change depending on the setting by a user and/or a manufacturing company).

In operation S430 of FIG. 4, the first control information corresponding to control of the external apparatus may be received in the display apparatus.

The optical signal (a first control signal) output from the remote control device 10 may be received not only in the external apparatus 400 but also in the exposed display apparatus 100. If the external apparatus 400 is hidden inside the furniture 1, it may be difficult for the external apparatus 400 to receive an optical signal (corresponding to the first control signal) regardless of a user's intention. The optical signal (the first control signal) repeatedly output from the remote control device 10 may be received in the optical receiver 150 of the display apparatus 100 regardless of a user's intention.

The controller 110 of the display apparatus 100 may store the received optical signal in the storage 180.

In operation S440 of FIG. 4, the display apparatus may determine whether to provide control information to the external apparatus.

If the first control information is received from the remote control device 10, the controller 110 of the display apparatus 100 may analyze the first control information (e.g., a header of the first control information or a header of the optical signal). For example, the controller 110 may analyze the remote control data format corresponding to the received first control information.

The controller 110 may compare a remote control data format for the display apparatus 100 pre-stored in the storage 180 with a remote control data format corresponding to the received first control information.

As the result of the comparison, the controller 110 may not analyze the received first control information. The first control information may correspond to changing a channel in the external apparatus 400, and it may be difficult to analyze the first control information in the display apparatus 100.

If the first control information that is difficult to be analyzed in the display apparatus 100 is received, the controller 110 may determine whether to receive the first control information. Further, the controller 110 may analyze the period (e.g., the number of repetitions) of the received first control information. For example, the first control information is received during an established time (e.g., 5 secs, but may vary depending on a remote control device), the controller 110 may determine whether to receive the first control information.

If the first control information that is difficult to be analyzed in the display apparatus 100 is consecutively received during an established time, the controller 110 may determine whether to receive the first control information that corresponds to another apparatus, not the display apparatus 100, from the remote control device 10.

If the controller 110 cannot analyze the first control information, the controller 110 may analyze the first control information by comparing the first control information with a remote control data format of another apparatus (e.g., an apparatus positioned near the display apparatus 100 or connected with the display apparatus 100 via cable or wirelessly).

According to the analysis (or comparison) result, the controller 110 may determine an original reception object apparatus corresponding to the first control information. The controller 110 may determine an original reception object apparatus (e.g., the external apparatus 400) by analyzing the first control information (e.g., a header of the first control information or a header of the optical signal).

Once an original reception object apparatus is determined, the controller 110 may determine whether to provide the control information to the hidden reception object apparatus (e.g., the external apparatus 400), and determine no reception of the first control information in the original reception object apparatus.

If it is determined that the original reception object apparatus is the hidden external apparatus 400, the controller 110 may store the first control information in the storage 180 as first hidden apparatus control information. The stored first hidden apparatus control information may include an identifier (ID) of first hidden apparatus control information, an identifier of a hidden apparatus, a type of a hidden apparatus, a name of a hidden apparatus, a reception time of first control information, the number of repetition of first control information or a remote control data format corresponding to first control information and the like, which are for managing a history.

In operation S450 of FIG. 4, the display apparatus may transmit second control information to the hidden control device.

Once it is determined to provide control information to the hidden external apparatus 400, the controller 110 may convert (or generate) the first control information into the second control information to correspond to the communication method (e.g., cable) between the display apparatus 100 and the hidden control device 300. Also, once it is determined to provide the control information to the hidden external apparatus 400, the controller 110 may convert (e.g., generate) the first control information into the second control information for controlling the hidden external apparatus 400.

The second control information may be substantively the same (e.g., a control command may be the same but the communication method may be different) as the first control information.

The controller 110 may transmit the second control information to the hidden control device 300 through the input/output unit 160.

The second control information may be the same as the first control information. The controller 110 may transmit the received first control information to the hidden control device 300 through the input/output unit 160.

In operation S460 of FIG. 4, third control information may be transmitted from the hidden control device to the hidden external apparatus.

The controller 310 of the hidden control device 300 may receive the second control information transmitted from the display apparatus 100 via cable. The controller 310 of the hidden control device 300 may store the received second control information in the storage 380.

The controller 310 of the hidden control device 300 may convert (or generate) the second control information into the third control information to correspond to the communication method (e.g., an infrared communication) between the hidden control device 300 and the external apparatus 400.

The third control information may be substantively similar (e.g., a control command may be the same, but the communication method may be different) to the second control information. The third control information may also be substantively the same (e.g., a control command may be the same, and the communication method may also be the same) as the first control information.

The controller 310 may output the third control information to the external apparatus 400 through the optical output unit 355. The controller 310 may output the third control information to the external apparatus 400 through the optical output unit 355*a* to 355*d* or 355*a'* to 355*c'*.

In operation S470 of FIG. 4, the external apparatus may operate in response to the third control information.

Referring to FIG. 5C, the third control information output from the hidden control device 300 may be received in the external apparatus 400. The third control information output from the hidden control device 300 may be received in the optical receiver of the external apparatus 400.

If the third control information is received from the hidden control device 300, the controller of the external apparatus 400 may analyze the third control information (e.g., a header of the third control information or a header of the optical signal). For example, the controller of the external apparatus 400 may analyze a remote control data format corresponding to the received third control information.

The controller of the external apparatus 400 may compare a remote control data format for the external apparatus 400 pre-stored in the storage with a remote control data format corresponding to the received third control information.

Depending on the analysis (comparison) result, the controller of the external apparatus 400 may control an operation of the external apparatus 400. For example, the controller of the external apparatus 400 may change a current channel number (e.g., 'Ch. 507,' 402) of the external apparatus 400.

The controller of the external apparatus 400 may transmit fourth control information corresponding to channel change to the display apparatus 100 connected via cable. The controller 110 of the display apparatus 100 may receive the fourth control information through the input/output unit 160.

The controller 110 may perform control to change a content 102 displayed on a screen of the display apparatus 100 in response to channel change (e.g., receiving the fourth control information) of the external apparatus 400. For example, the controller 110 may control to display the content 102 corresponding to a channel number 102A changed in the display apparatus 100 in response to channel change (e.g., receiving the fourth control information) of the external apparatus 400.

In operation S470 of FIG. 4, if the external apparatus operates in response to the third control signal, the control method for controlling the display apparatus may terminate.

In an example embodiment, other operations of the display apparatus may be controlled.

Figure 5D:
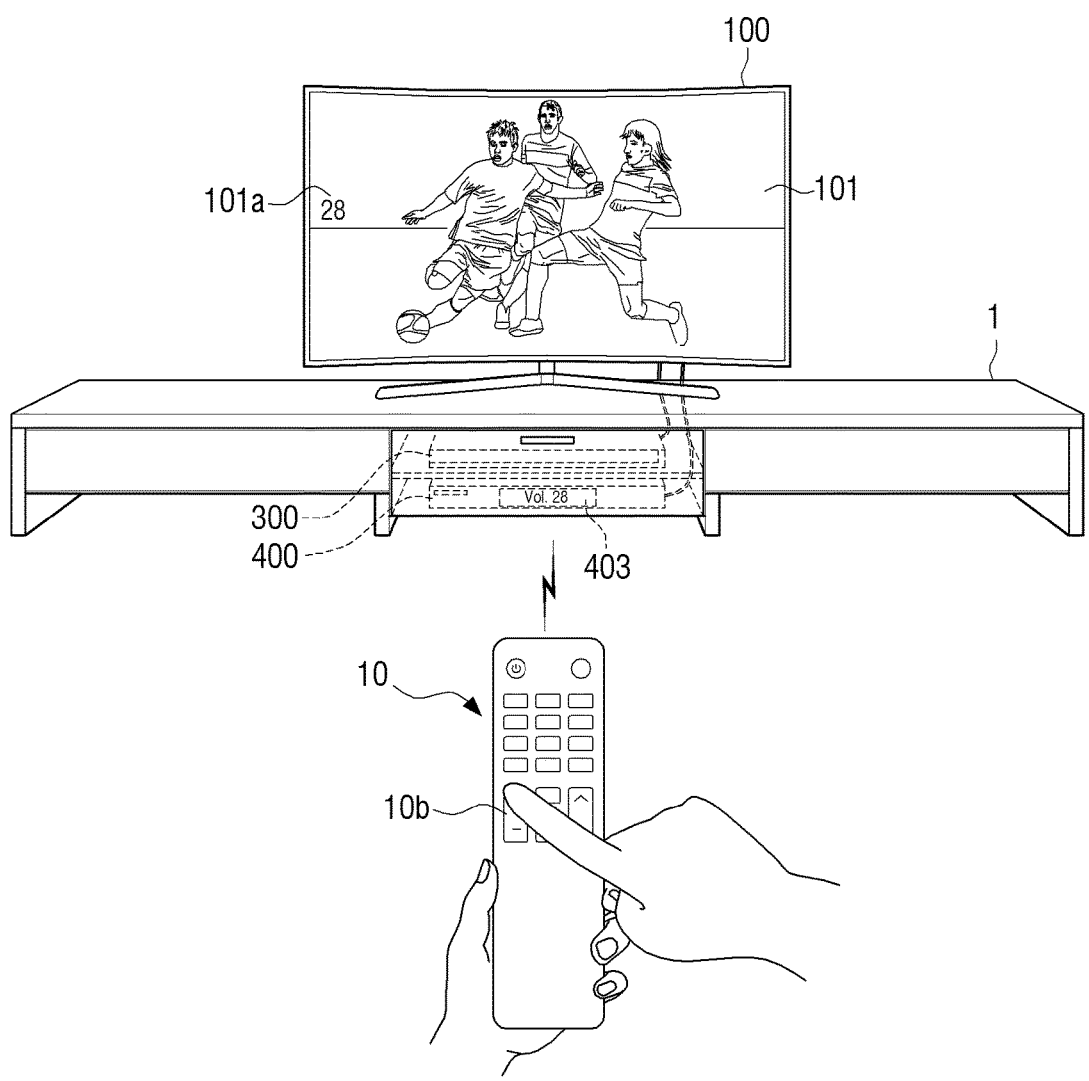

Referring to FIG. 5D, a user may select a button 10B of the remote control device 10 according to another example embodiment. For example, the button 10B may be a volume button 10B.

The operation (S420 to S460 of FIG. 4) corresponding to selection (another example embodiment) of the volume button 10B on the remote control device 10 is substantively similar to the operation (S420 to S460 of FIG. 4) corresponding to the selection (the example embodiment) of the channel button 10a on the remote control device 10, and thus, the overlapped description will not be repeated.

The controller of the remote control device 10 may output 11th control information corresponding to the selection of the volume button 10B through the optical output unit. The exposed display apparatus 100 may receive the 11th control information. According to analysis (comparison) of the 11th control information, the controller 110 of the display apparatus 100 may determine whether to provide control information to the external apparatus 400.

In response to the determination of whether to provide control information to the external apparatus 400, the controller 110 may transmit converted (or generated) 12th control information to the hidden control device 300 through the input/output unit 160.

The controller of the hidden control device 300 may convert (or generate) the received 12th control information into 13th control information to correspond to the communication method between the hidden control device 300 and the external apparatus 400. The controller of the hidden control device 300 may output the 13th control information to the external apparatus 400 through the optical output unit 355.

The 13th control information output from the hidden control device 300 may be received in the optical receiver of the external apparatus 400.

When the 13th control information is received from the hidden control device 300, the controller of the external apparatus 400 may analyze the 13th control information (e.g., a header of the third control information or a header of the optical signal).

Analysis (comparison) of the 13th control information is substantively similar to the analysis (or comparison) of the third control information, and thus, the overlapped description will not be repeated.

Depending on the analysis result, the controller of the external apparatus 400 may change (e.g., 'Vol. 28,' 403) current volume of the external apparatus 400.

The controller 110 of the external apparatus 400 may control to display the changed volume value 101a on the display apparatus 100 in response to the volume change of the external apparatus 400 (e.g., receiving fourth' control information).

In operation S470 of FIG. 4, if the external apparatus operates in response to the 13th control signal, the control method for controlling the display apparatus may terminate.

In another example embodiment, an operation of the display apparatus may be controlled differently. In the above-described example embodiment (hereinafter, referring to "the first example embodiment"), only the display apparatus 100 may be exposed. The hidden control device 300 and the external apparatus 400 may be hidden. In another example embodiment, the display apparatus 100 and the hidden control device 300 may be exposed. The external apparatus 400 may be hidden.

Operations (S410 to S430) in FIG. 4 may be similar to the first example embodiment.

Referring to FIG. 5A, the display apparatus 100 and the hidden control device 300 may be exposed, and the external apparatus 400 may be hidden. The display apparatus 100 may be connected with the external apparatus 400 hidden inside the furniture 1 via cable or wirelessly. The display apparatus 100 may also be connected with the hidden control device 300 exposed to outside of the furniture 1 via cable or wirelessly.

Referring to FIG. 5B, when a button of the remote control device is selected, a user may select the button 10a on the remote control device 10. The example is substantively similar to operation S420 of FIG. 4 of the first example embodiment, and thus, the overlapped description will not be repeated.

If the first control information corresponding to the selection of the button 10a is transmitted through the optical output unit, not only the display apparatus 100 but also the hidden control device 300 may receive the first control information corresponding to control of the external apparatus 100.

The display apparatus 100 may determine whether or not to hide (expose) the hidden control device 300.

If the first control information transmitted from the remote control device 10 is received in the display apparatus 100, the analysis of the first control information (e.g., a header of the first control information or a header of the optical signal) in the controller 110 is substantively the same as the analysis of the first control information in the first example embodiment, and thus, the overlapped description will not be repeated. Also, the comparison between a remote control data format for the display apparatus 100 in the controller 110 and a remote control data format corresponding to the received first control information is substantively the same as the comparison in the first example embodiment, and thus, the overlapped description will not be repeated.

If the controller 110 cannot analyze the received first control information, the controller 110 may determine whether to receive the first control information. The determination of reception of the first control information is substantively the same as the determination of the reception in the first example embodiment, and thus, the overlapped description will not be repeated.

If the controller 110 cannot analyze the received first control information, the controller 110 may determine reception of the first control information by comparing the first control information with a remote control data format of another apparatus (e.g., an apparatus positioned near the display apparatus 100 or connected with the display apparatus 100 via cable or wirelessly). The determination of reception of the first control information by comparing the first control information with a remote control data format of another apparatus is substantively the same as the determination of the reception in the first example embodiment, and thus, the overlapped description will not be repeated.

The 11th control information (for example, corresponding to the first control information) transmitted from the hidden control device 300 may be received in the display apparatus 100 within an established time via cable or wirelessly. The 11th control information transmitted from the hidden control device 300 may also be received in the external apparatus 400.

The 11th control information received from the hidden control device 300 may correspond to another apparatus (e.g., an apparatus positioned near the display apparatus 100 or connected with the display apparatus 100 via cable or wirelessly). The 11th control information received from the hidden control device 300 may correspond to a remote control data format of another apparatus (e.g., an apparatus positioned near the display apparatus 100 or connected with the display apparatus 100 via cable or wirelessly).

If 11th control information is received from the hidden control device 300 within an established time (e.g., 60 ms to 1 s, possible to change the established time) after the determination of reception of the first control information, the controller 110 may determine whether not to hide the hidden control device 300. If the 11th control information is received from the hidden control device 300 within the established time (e.g., 60 ms to 1 s, possible to change the established time) after the display apparatus 100 receives the first control information, the controller 110 may determine whether not to hide the hidden control device 300.

After an original reception object apparatus is determined based on analysis of the first control information received from the display apparatus 100, the controller 110 may analyze the first control information received from the hidden control device 300 within an established time (e.g., 60 ms to 1 s, possible to change the established time). The controller 110 may determine an original reception object apparatus based on the analysis of the 11th control information.

According to the analysis result, if the original reception object apparatus corresponding to the first control information is the same as the original reception object apparatus corresponding to the 11th control information, the controller 110 may determine whether not to hide the hidden control apparatus 300.

Once the display apparatus 100 determines not to hide the hidden control apparatus 100, the controller 110 may not transmit the second control information scheduled to be transmitted to the hidden control device 300.

The external apparatus 400 may be controlled only by the hidden control device 300 that is not hidden. The external apparatus 400 may operate (e.g., changing a channel) in response to the 11th control information transmitted from the hidden control device 300 that is not hidden.

The operation in the external apparatus 400 which corresponds to the 11th control information transmitted from the hidden control device 300 that is not hidden is substantively similar to the operation in the external apparatus 100 which corresponds to the third control information transmitted from the hidden control device 300 that is hidden in the first example embodiment. Thus, the overlapped description will be omitted.

If the display apparatus 100 determines whether not to hide the hidden control device 300, the controller 110 may transmit 21th control information (e.g., a header of the second control information is modified) to the hidden control device 300. If the 21th control information is received in the hidden control device 300, the controller 310 of the hidden control device 300 may analyze the 21th control information.

The controller 310 of the hidden control device 300 may cease an operation of the optical receiver in response to the analysis of the 21th control information. The controller 310 of the hidden control device 300 may control not to supply power to the optical receiver 350 according to the analysis of the 21th control information. The controller 310 of the hidden control device 300 may also control the power supply not to supply power to the optical receiver 350 according to the analysis of the 21th control information.

The external apparatus 400 may be controlled by the hidden control device 300 that is not hidden and which transmits the third control information corresponding to the second control information received from the display apparatus 100.

The external apparatus 400 may operate (for example, changing a channel) according to the third control information transmitted from the hidden control device 300 that is not hidden.

The operation in the external apparatus 400 which corresponds to the third control information transmitted from the hidden control device 300 that is not hidden is substantively similar to the operation in the external apparatus 400 which corresponds to the third control information transmitted from the hidden control device 300 that is hidden in the first example embodiment. Thus, the overlapped description will not be repeated.

The external apparatus operates in response to the third control signal, the control method for controlling the display apparatus may terminate.

The methods according to one or more example embodiments may be implemented as a program command type that may be performed through various computer units and may be recorded in a computer readable medium. The computer-readable medium may include program commands, data files, and data structures either alone or in combination. For example, the computer-readable medium may be stored in a volatile or non-volatile storage device such as a ROM, a memory such as a RAM, a memory chip, and a device or an integrated circuit, or a storage medium which may be read with a machine (e.g., computer processing unit (CPU)) simultaneously with being optically or magnetically recorded like a CD, a DVD, a magnetic disk, a magnetic tape, or the like, regardless of whether it is deleted or again recorded. The memory, which may be included in a mobile terminal, may be one example of a storage medium which may be read with programs including instructions implementing the example embodiments or a machine appropriate to store the programs. The program command recorded in a recording medium may be specially designed and configured for the present disclosure or may be usable as the program command is notified to a person skilled in computer software.

While the present disclosure has been illustrated and described with reference to various example embodiments and drawings thereof, it will be understood by those skilled in the art that various changes in form and details may be made therein.

Accordingly, the scope of the present disclosure is not limited to the described example embodiments, but is defined by the appended claims as well as equivalents thereof.

What is claimed is:

1. A display apparatus comprising:
   a storage;
   a display;
   an optical receiver comprising optical receiving circuitry;

an input/output unit comprising input/output circuitry configured to be connected, via a cable, with a hidden control device for controlling a hidden external apparatus; and a processor configured to:
receive a first signal, which is an optical signal, representing a command for controlling the hidden external apparatus, through the optical receiver,
based on a data format of the first signal being different from a data format for the display apparatus stored in the storage, output a second signal representing the command to the hidden control device through the input/output unit such that the command is transmitted to the hidden external apparatus from the hidden control device,
wherein the processor is further configured, based on the first signal corresponding to a third signal received from the hidden external apparatus, to not output the second signal.

2. The display apparatus of claim 1, wherein the remote control device is an exclusive remote control device configured to exclusively control the hidden external apparatus.

3. The display apparatus of claim 1, wherein the processor is configured to analyze a header included in the first signal.

4. The display apparatus of claim 1, wherein the hidden control device is configured to be hidden like the external apparatus.

5. The display apparatus of claim 1, wherein the hidden control device is configured to transmit the command as a fourth signal based on a communication method of the hidden external apparatus to the hidden external apparatus through an optical output unit comprising optical output circuitry.

6. The display apparatus of claim 5, wherein the hidden external apparatus is connected through the input/output unit of the display apparatus.

7. The display apparatus of claim 6, wherein the processor, in response to an operation change of the hidden external apparatus by the command, is configured to receive, through the input/output unit, a fourth signal for changing an operation of the display apparatus.

8. A method for controlling a display apparatus, the method comprising:
displaying content on a display apparatus connected with a hidden external apparatus and a hidden control device for controlling the hidden external apparatus, respectively;
receiving, from a remote control device, through an optical receiver of the display apparatus, a first signal, which is an optical signal, representing a command for controlling the hidden external apparatus
based on a data format of the first signal being different from a data format for the display apparatus stored in the display apparatus, transmitting, to the hidden control device, though an input/output unit of the display apparatus, a second signal representing the command such that the command is transmitted to the hidden external apparatus from the hidden control device,
wherein the transmitting comprises, based on the first signal corresponding to a third signal received from the hidden external apparatus, not transmitting the second signal.

9. The method of claim 8, wherein the analyzing comprises analyzing a header included in the first signal.

10. The method of claim 8,
wherein the first signal corresponds to a communication method between the display apparatus and the remote control device, and
wherein the second signal corresponds to a communication method between the display apparatus and the hidden control device.

11. The method of claim 8, further comprising:
receiving, from the hidden external apparatus, a fourth signal corresponding to an operation change of the hidden external apparatus; and
changing an operation of the display apparatus in response to the fourth signal.

12. The method of the changing of claim 11, wherein the changing comprises changing one of a channel and a volume.

* * * * *